Aug. 22, 1967 L. J. MAYER 3,336,789
METHOD FOR CALIBRATING A FIXTURE FOR GEAR INSPECTION
Filed June 7, 1965 3 Sheets-Sheet 1
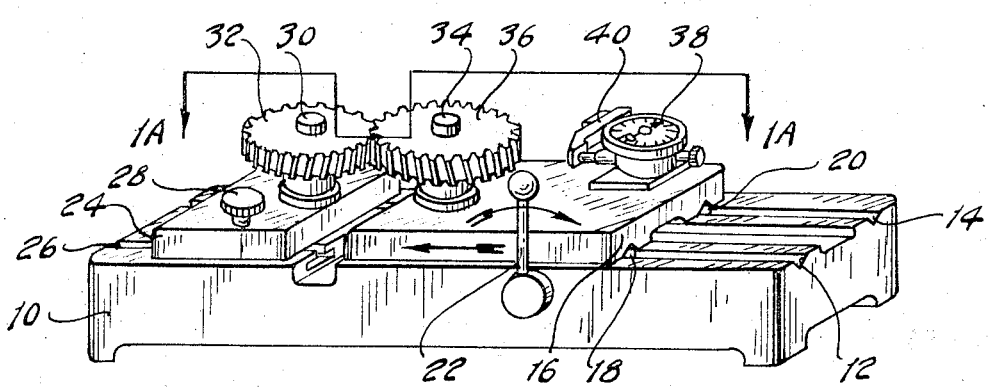
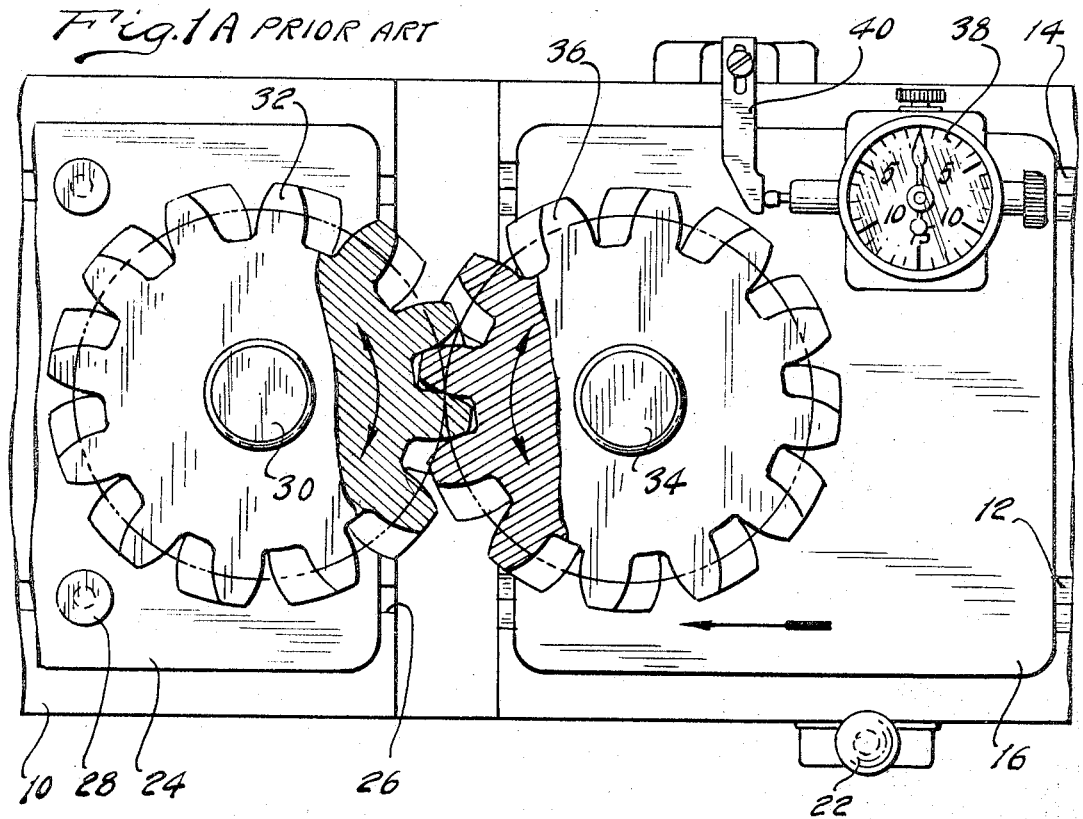
INVENTOR:
LAWRENCE J. MAYER
BY
ATTORNEYS.

INVENTOR:
LAWRENCE J. MAYER

Aug. 22, 1967 L. J. MAYER 3,336,789
METHOD FOR CALIBRATING A FIXTURE FOR GEAR INSPECTION
Filed June 7, 1965 3 Sheets-Sheet 3

INVENTOR:
LAWRENCE J. MAYER
BY
ATTORNEYS

United States Patent Office 3,336,789
Patented Aug. 22, 1967

3,336,789
METHOD FOR CALIBRATING A FIXTURE FOR GEAR INSPECTION
Lawrence J. Mayer, Royal Oak, Mich., assignor to Ford Motor Company, Dearborn, Mich., a corporation of Delaware
Filed June 7, 1965, Ser. No. 461,877
1 Claim. (Cl. 73—1)

ABSTRACT OF THE DISCLOSURE

The specification describes a method for calibrating a gear checking apparatus prior to the check of a part gear for irregularities such as excessive errors in profile, pitch diameter runout, tooth spacing and lead. The apparatus used during the calibration procedure includes an arbor adapted to be mounted upon a first arbor shaft that accommodates the part gear during the checking operation. The arbor includes a pin with a round element on its extremity which registers with the tooth space for the master gear, the latter being mounted for oscillation about an arbor shaft situated in parallel relationship with respect to the first arbor shaft.

Brief description of the invention

My invention relates generally to gear rolling, and more particularly to gear inspection techniques for determining composite errors due to errors in tooth spacing, tooth profile errors, pitch diameter runout, and lead wobble.

It is known practice to inspect close tolerance gearing by mounting the gear to be checked on a suitable gear rolling fixture so that it is adapted to mesh with a master gear. The master gear and the part gear are adpted for rotation about separate, fixed arbor shafts. As one gear is rolled in meshing engagement with the other, the changes in the center distance between the arbors for the separate gears can be measured by means of a displacement indicator of the required sensitivity.

In a gear testing fixture of this type, it becomes necessary to set the indicator to a zero setting before the gear rolling step is carried out. The zero setting represents a reference point from which deviations in center distance can be measured. It is common practice in an arrangement of this type to employ pitch diameter discs for setting the indicator to zero prior to a functional check for any given part gear. In this way, one precalibrated disc is mounted upon one arbor and another precalibrated disc is mounted upon the other arbor as the setting fixture is adjusted to the zero setting. When the pitch diameter discs are removed, the master gear is mounted upon the fixture. Any one of several part gears then can be checked by mounting them individually upon the other arbor and bringing them into mesh with the master gear. This is followed by rotation of the part gear and a recording of the deviations determined by the indicator that measures the changes in the center distance.

If the master gear in such a conventional testing fixture becomes worn, it must be scrapped since a regrinding of the master gear to compensate for the wear would introduce an inherent error as the pitch diameter discs are used subsequently to adjust the fixture to a zero setting.

Another method that is used in the industry for calibrating a gear rolling fixture is known as the master reference gear checking method. In this method, the reference gear is mounted upon the arbor so that it will represent the part gear to be checked. It is brought into meshing engagement with the master gear, and the fixture then is adjusted to a zero setting. The tooth thickness, the pitch diameter runout and the other gear characteristics of the master reference gear must be held to very close tolerances. Thus, the cost of the master reference gear is substantial. This additional manufacturing cost, however, can be offset somewhat because of the savings involved in the regrinding of the master rolling gear after it becomes worn. Unlike the pitch diameter disc calibrating method, regrinding is possible in the master gear and the master reference gear checking method thus avoiding the necessity for machining and calibrating a new master gear.

It is an object of my invention to provide another gear rolling fixture calibration method which has the cost advantages of the pitch diameter disc checking method as well as the functional advantages of the master reference gear checking method. I have done this while avoiding the necessity for using a master reference gear. I have provided instead a gear rolling fixture setting gauge which may be mounted on the arbor that normally supports the part gear.

The setting gauge comprises either a pin or a ball situated on an adapter that in turn is carried by a collar mounted on the arbor for the part gear. The pin or the ball is brought into meshing engagement with the master gear and is used in the same fashion as a master reference gear. It will permit regrinding of the master gear.

A gear rolling fixture of the type above set forth being an object of my invention, it is another object of my invention to provide a setting gauge for use in such a fixture and which includes a pin or ball of known diameter situated at a known radius from the axis of the arbor upon which the part gear normally would be mounted.

It is a further object of my invention to provide an improved checking method for calibrating gear rolling fixtures which employ my improved setting gauge.

It is a further object of my invention to provide a gear rolling fixture setting gauge which includes a fixed collar and an adapter that can be attached and removed from the collar as desired to permit assembly of adapters of different radial dimension so that the fixture can be adapted for checking part gears having any of a variety of pitch diameters.

Brief description of the figures of the drawings

FIGURE 1 shows in isometric form a side elevation view of a conventional gear rolling fixture.

FIGURE 1A is a plan view of the fixture of FIGURE 1 taken along the plane of section line 1A—1A of FIGURE 1.

Particular description of the invention

Figure 3:
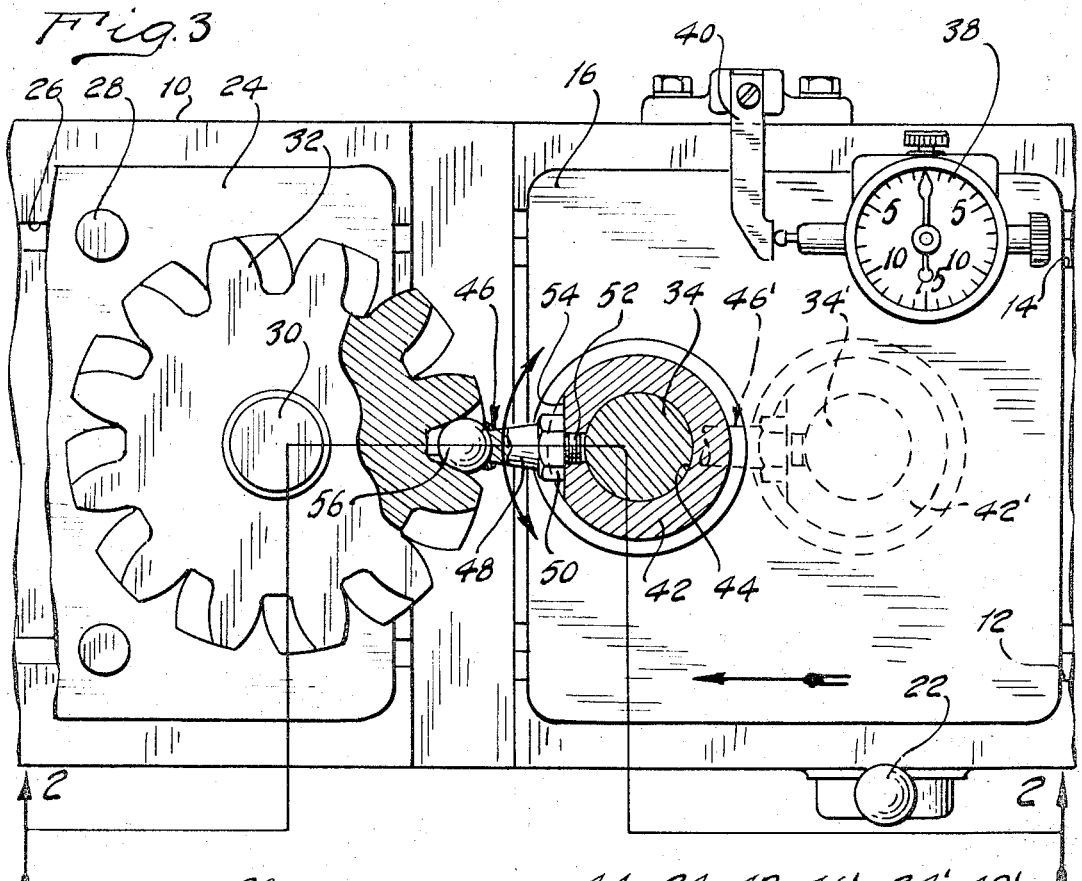
FIGURE 3 is a plan view of the structure of FIGURE 2 taken along the plane of section line 3—3 of FIGURE 3.

In FIGURES 1 and 1A, numeral 10 designates a bed for a gear rolling fixture. It includes two V-shaped guideways 12 and 14 situated in parallel disposition and extending axially with respect to the major axis of the bed 10.

A carriage 16 mounted upon the upper surface of the bed 10 is formed with guideways that are similar to and juxtaposed with respect to the guideways 12 and 14. Ball bearings 18 and 20 are located in guideways 12 and 14, respectively, so that the carriage 16 can be adjusted with a floating motion in an axial direction with respect to the bed 10. Provision may be made for manually adjusting the carriage 16 by means of a hand operated lever 22, and a suitable mechanical mechanism can be used for transferring rotary motion of lever 22 to reciprocating motion of the carriage 16. The lever 22 is mounted for oscillatory motion on the bed 10.

Spring means (not shown) can be provided for urging normally the carriage 16 in a left-hand direction as viewed in FIGURE 1.

A sliding bed 24 is mounted upon the upper surface of bed 10. A pair of T-slots 26 can be provided in the upper surface of the bed 10. Hold down bolts 28, which can be anchored in anchor elements slidably situated in T-slots 26, releasably lock the sliding bed 24 to the stationary bed 10.

An arbor 30 rotatably positions a master rolling gear 32. An arbor 34 rotatably positions a part gear 36. The arbor 34 is carried by the sliding carriage 16, and the arbor 30 is secured to the sliding bed 24. The sliding bed 24 can be adjusted to provide the proper center distance between the arbors. When this adjustment is completed, the bed 24 can be locked fast by the bolts 28.

An indicator 38 is carried by the carriage 16. It engages a bracket 40, which in turn is secured fast to the stationary bed 10.

To mount the part gear 36 in place, the lever 22 is rotated in a clockwise direction thereby moving the arbors apart. After the gear 36 is mounted on the arbor 34 and the lever 22 is moved in a counterclockwise direction, the gears are retained in place by reason of the continuous spring tension applied to the carriage 16.

Figure 4:
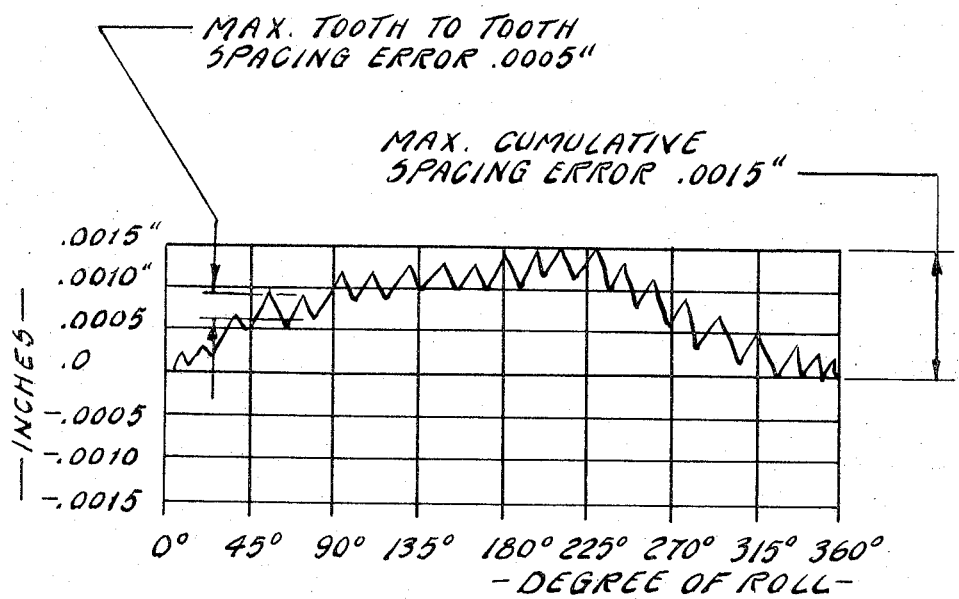
FIGURE 4 is a recording of the readings for a typical gear checked with my gear rolling fixture.

As the part gear 36 is rotated, gear tooth errors such as pitch diameter runout, tooth spacing errors, involute or gear tooth profile errors, errors in tooth thickness and lead wobble will result in a composite error that is indicated by the indicator 38. If the readings of the indicator 38 are recorded for each degree of roll of the gear 36, a chart of the type shown in FIGURE 4 will result. I contemplate that the deviations of the data shown in FIGURE 4 will indicate the amount of spacing error and the maximum cumulative spacing error. Maximum limits can be assigned to each of these errors, and if the particular part gear has an error that exceeds these limits, it can be rejected as part of the inspection procedure.

Figure 2:
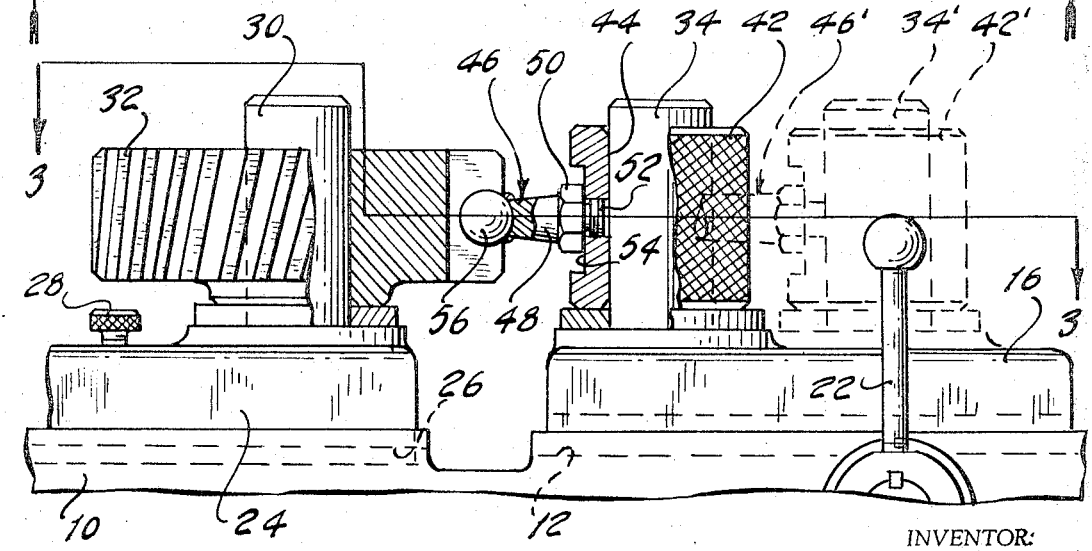
FIGURE 2 shows one form of adapter for use with my improved gear rolling fixture. It is taken along the plane of section line 2—2 of FIGURE 3.

In order to calibrate the gear rolling fixture and to set it at zero setting prior to the beginning of the inspection procedure, the setting gauge of FIGURES 2 and 3 can be used. The setting gauge comprises a collar 42 having a central bore 44 which can accommodate the arbor 34. An adapter 46 is carried by the collar 42. It comprises an elongated part 48 and a base part 50. The base part is formed with a threaded stud 52 which is threadably received within a threaded hole in the side of the collar 42. The base part 50 is formed with a surface that engages a flat surface 54 on the side of the collar 42.

The extended end of the adapter 46 carries a spherical ball 56 of known diameter. In the alternative, the adapter 46 can carry a cylindrical pin instead of the ball 56. Such pins or balls are well known in the gear industry. They are used for obtaining over-the-pin dimensions.

By removing the part gear 36 from the structure shown in FIGURE 1 and by mounting the setting gauge of FIGURE 2 on the arbor 34, the ball 56 can be brought into meshing engagement with the teeth of the master gear 32. If the pressure angle, the circular pitch and the pitch diameter as well as the other characteristics of the part gear are known, then an appropriate setting gauge can be chosen. The setting gauge then is mounted upon the collar 42 and the ball of the setting gauge is brought into registry with the teeth of the gear 32. The adapter of FIGURE 2 then is rotated back and forth until the maximum center distance is obtained. This maximum center distance then is used as a zero setting for the indicator 38. After this operation is completed, the adapter can be removed and the part gear then can be applied. As the part gear is rotated, deviations from the zero setting can be registered by the indicator 38 so that a chart of the type shown in FIGURE 4 can be obtained.

Figure 5:
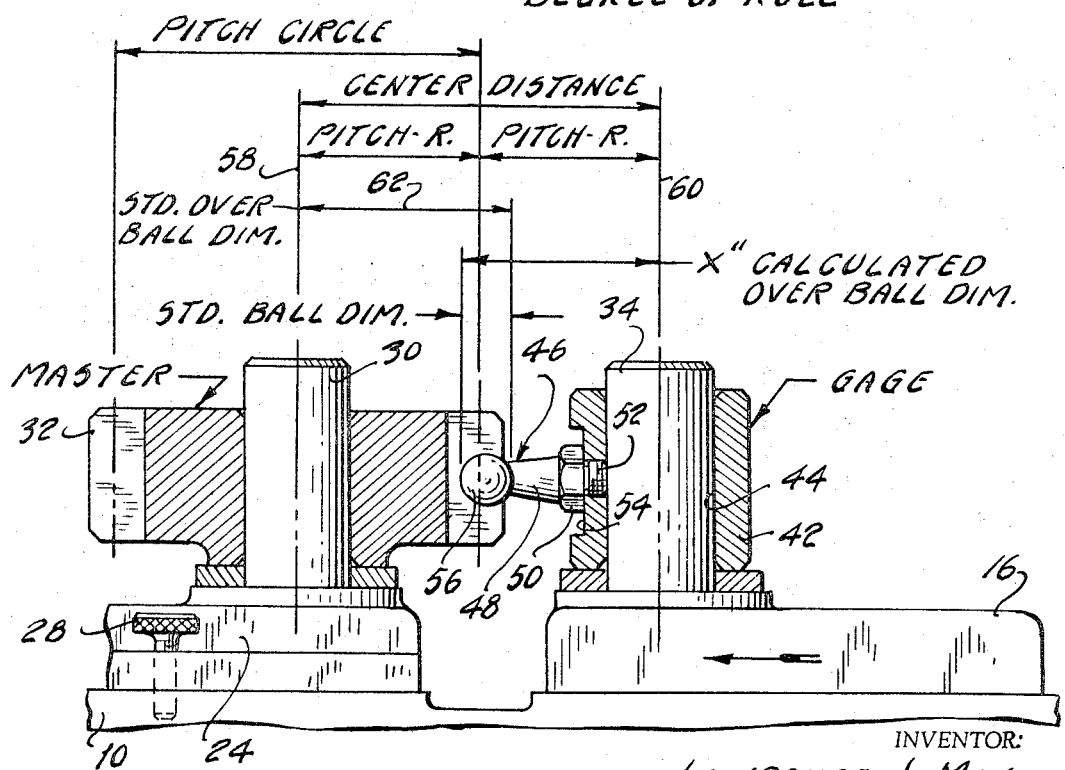
FIGURE 5 is a view showing the geometry of the gear rolling fixture of FIGURES 2 and 3 which is useful in calibrating the distance between the center lines of the arbors of FIGURES 2 and 3 and the maximum radial dimension of the ball or pin associated with the setting gauge.

Although it is desirable to have the point of contact on the ball 56 coincide with the pitch point on each of the adjacent gear tooth surfaces of the master gear, it is not essential that it contact the tooth precisely at that point. It is possible to calibrate the length of the setting gauge required for any given application in which the pitch radii are known. In FIGURE 5 the master gear is mounted for rotation about a center 58. The part gear is mounted for rotation about the center 60 which also corresponds to the center of the adapter.

The distance between the center lines 58 and 60 is equal to the sum of the pitch radii. This, of course, equals the operational pitch diameter of the part to be checked plus the operational pitch diameter of the master rolling gear divided by two. To this value is added the diameter of the ball 56, which is held to close tolerances and is of known value. From this quantity is subtracted the mean radial pin measurement of the master rolling gear. This dimension can be held to ±.0002 of an inch and is of known value. This quantity is indicated by the reference numeral 62.

If the master gear diameter is smaller than that illustrated in FIGURES 2 and 3, it will be necessary to provide a setting gauge of greater radial extent.

Shown in FIGURES 2 and 3 in phantom lines is the retracted position of the arbor 34 and the setting gauge. The reference characters used in the phantom portions of FIGURES 2 and 3 designate the same parts shown in full lines, although prime notations have been added.

By employing my improved rolling gear fixture checking method, I increase the accuracy of the checking method and reduced the cost of the inspection procedure.

It is possible, of course, to interchange the master rolling gear and the gauge or interchange the master rolling gear and the part gear. The same checking procedures can be employed regardless of the relative positions.

Having thus described a preferred form of my invention, what I claim and desire to secure by U.S. Letters Patent is:

A method for calibrating a gear rolling fixture having a master gear and an arbor for rotatably supporting a part gear, comprising the steps of mounting a collar on said arbor, securing a setting gauge in the form of a pin on said collar, said gauge having formed thereon a round checking element on the radially outward extremity of said pin, providing for a relative floating movement between said master gear and said arbor, rotating said collar about the axis of said arbor so that said round element registers with the teeth of said master gear, measuring the maximum distance between the center line of said master gear and the center line of said arbor, and utilizing said maximum distance as a zero reference point for said fixture.

References Cited

UNITED STATES PATENTS

| | | | |
|---|---|---|---|
| 2,327,948 | 8/1943 | Webster | 33—172 |
| 2,657,469 | 11/1953 | Brown | 33—179.56 |
| 2,992,491 | 7/1961 | Hofler | 33—179.5 |
| 3,069,779 | 12/1962 | Bauer et al. | 33—179.5 |
| 3,237,442 | 3/1966 | De Vos | 33—179.5 X |

SAMUEL S. MATTHEWS, Primary Examiner.